(No Model.)
W. YOUNG.
IMPLEMENT FOR WIRING HEDGE FENCES.
No. 287,077. Patented Oct. 23, 1883.
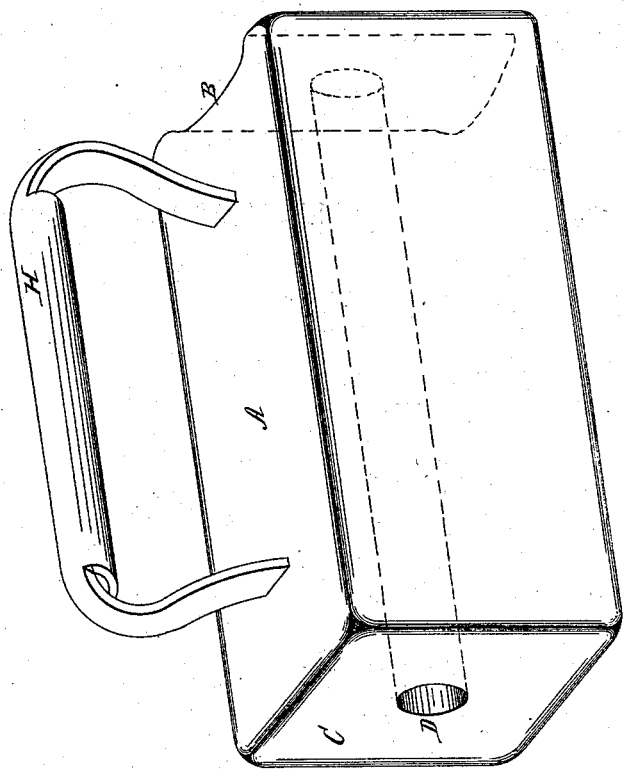
Witnesses:
W. C. Jindiuston
D. W. Norris
Inventor:
Wesley Young
by Melville Church
his Attorney.

UNITED STATES PATENT OFFICE.

WESLEY YOUNG, OF DAYTON, OHIO.

IMPLEMENT FOR WIRING HEDGE-FENCES.

SPECIFICATION forming part of Letters Patent No. 287,077, dated October 23, 1883.

Application filed April 23, 1883. (No model.)

*To all whom it may concern:*

Be it known that I, WESLEY YOUNG, of Dayton, in the county of Montgomery and State of Ohio, have invented a certain new and useful Implement for use in Wiring Hedge-Fences, of which the following is a full, clear, and exact description, reference being had to the accompanying drawing, forming part of this specification, and to the figures and letters of reference marked thereon.

In the application of wires to hedge-fences the lines of wire are first stretched along the row of plants, and then, by means of a suitable instrument, double-pointed nails or staples are driven into the plants, so as to embrace the wires and fasten them securely to the plants. As the plants are comparatively small and yielding in their nature, it is important, in order to effectively employ the staple-driving instrument, that a resistance be applied to the opposite side of the plant when the staple is driven, so that the plant will be held firm and steady, and enabling the staple to be readily inserted. In practice, a stone, block of wood, or other thing nearest at hand having sufficient weight has usually been employed; but such objects cannot be conveniently handled and supported, and if the staple happens to pass entirely through the plant its points are turned, often resulting in the splitting of the plant and its consequent injury.

The object of my invention therefore is to provide an improved implement which can be easily and conveniently handled and supported, and which will permit the points of a staple to be driven entirely through a plant without being turned so as to split the latter.

Such an instrument is shown in perspective in the accompanying drawing.

It consists of a block or body, A, of metal or other hard material, preferably of oblong rectangular form with rounded off corners, and having one end, B, slightly curved or hollowed out, so as to better conform to the workman's leg and constitute an easy bearing-surface for the same, and having its opposite end, C, or the end which bears against the plant, made preferably flat and provided with a recess, D, into which the points of the staple may enter in case they are driven entirely through the plant, to prevent their being turned so as to split the plant. The recess D may be comparatively shallow, or it may extend entirely through the body, as shown by the dotted lines, in which latter case it is readily cleared in case it should become filled with dirt by pushing a stick or other suitable instrument through it.

For the purpose of transporting the implement and for holding it conveniently while in use, it is provided with a handle, H, formed with or attached to it in any suitable manner.

In using the implement its handle is grasped by the operator, and its end C is pressed against the plant, the leg of the operator in the curved end B assisting in giving the pressure and in steadying the implement in position. The staple is then easily driven into the plant from the opposite side, the plant being meanwhile held firmly to receive it. Should the points of the staple pass through the plant, they will enter the recess D, as before mentioned.

The weight, form, and dimensions of the implement may be somewhat varied so long as its salient features of structure are preserved.

I claim as my invention—

The herein-described implement, consisting of the body having the substantially flat end for bearing against the plant, the opening or recess for accommodating the points of the staples, the concaved end for conforming to the operator's leg, and the carrying and supporting handle, substantially as described.

WESLEY YOUNG.

Witnesses:
CHAS. M. WETZEL,
MICHL. NEIL.